(12) United States Patent
Gasparin et al.

(10) Patent No.: US 11,570,280 B2
(45) Date of Patent: Jan. 31, 2023

(54) SYSTEMS AND METHODS FOR RENDERING INTERACTIVE WEB PAGES

(71) Applicants: Atlassian Pty Ltd., Sydney (AU); Atlassian Inc., San Francisco, CA (US)

(72) Inventors: Alberto Gasparin, Sydney (AU); Monica Olejniczak, Sydney (AU); Rohan Deshpande, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/153,056

(22) Filed: Jan. 20, 2021

(65) Prior Publication Data
US 2022/0232102 A1    Jul. 21, 2022

(51) Int. Cl.
| H04L 67/75 | (2022.01) |
| H04L 67/02 | (2022.01) |
| G06F 16/958 | (2019.01) |
| G06F 16/955 | (2019.01) |
| H04L 67/50 | (2022.01) |

(52) U.S. Cl.
CPC ............ *H04L 67/75* (2022.05); *G06F 16/955* (2019.01); *G06F 16/986* (2019.01); *H04L 67/02* (2013.01); *H04L 67/535* (2022.05)

(58) Field of Classification Search
CPC ....... H04L 67/75; H04L 67/02; H04L 67/535; G06F 16/955; G06F 16/986
See application file for complete search history.

(56) References Cited

U.S. PATENT DOCUMENTS

| 10,938,925 | B1* | 3/2021 | Fitzhugh | H04L 67/18 |
| 11,080,065 | B1* | 8/2021 | Reshadi | H04L 67/34 |
| 2003/0023754 | A1* | 1/2003 | Eichstadt | H04L 67/42 |
| | | | | 709/219 |
| 2011/0029899 | A1* | 2/2011 | Fain | G06F 12/0862 |
| | | | | 715/806 |
| 2018/0359278 | A1* | 12/2018 | Rusakov | G06F 21/577 |
| 2019/0327324 | A1* | 10/2019 | Buffone | H04L 67/2819 |
| 2020/0104885 | A1* | 4/2020 | Abdulhayoglu | G06Q 30/02 |
| 2022/0043546 | A1* | 2/2022 | Glezeris | G06F 3/0484 |

FOREIGN PATENT DOCUMENTS

CN    109343908 A    *    2/2019    .........    G06F 9/44521

* cited by examiner

*Primary Examiner* — Oanh Duong
(74) *Attorney, Agent, or Firm* — Brownstein Hyatt Farber Schreck, LLP

(57) ABSTRACT

Systems and methods for rendering interactive web pages are disclosed. A disclosed method includes receiving a web page request, retrieving web page content for the web page, identifying one or more components that provide interactivity to the web page in the web content, determining whether the one or more components are critical components and communicating the determined one or more critical components in a Hypertext Markup Language (HTML) head and communicating the remainder of the web content in an HTML body.

20 Claims, 4 Drawing Sheets

SYSTEMS AND METHODS FOR RENDERING INTERACTIVE WEB PAGES

TECHNICAL FIELD

The present disclosure relates generally to rendering structured documents (such as web pages) and, more particularly, to efficiently rendering structured documents using asynchronous techniques.

BACKGROUND

To display a web page or application on a user device, a client browser receives structured documents from a server and processes these structured documents. When a web page or application includes one or more interactive elements or components, the browser receives and downloads scripts for the interactive elements/components and processes these for display. Renderings of such interactive elements/components can cause display of the web page to be slow, which negatively affects user experience.

SUMMARY

In certain embodiments of the present disclosure a computer-implemented method for responding to a web page request is disclosed. The method includes, at a server: receiving the web page request from a client device. The web page request including an identifier of the requested web page. The method further includes retrieving web page content based on the identifier of the requested web page. The web page content including Hypertext Markup Language (HTML) web content and one or more components that provide interactivity for the web page. The method further includes determining whether any of the one or more components are critical components, and in response to determining that at least one of the one or more components is a critical component, adding the at least one critical component to an HTML head and communicating the HTML head to a client device. In addition, the method includes communicating the remaining web page content in an HTML body to the client device for rendering.

In certain other embodiments of the present disclosure a computer implemented method for rendering an interactive web page is disclosed. The method includes, at a client browser: receiving a Hypertext Markup Language (HTML) head for the web page. The HTML head including at least one component tagged as critical and at least one component tagged as non-critical. The components provide interactivity to the web page. The method further includes initiating a component processing thread, downloading and storing the at least one critical component in a data storage of the client browser, and downloading and storing the at least one non-critical component in the data storage after download of the at least one critical component is completed. The method further includes initiating a render processing thread, receiving and rendering an HTML body for the web page, loading the at least one critical component and loading the at least one non-critical component after loading the at least one critical component.

In some further embodiments, a server system for responding to a web page request is disclosed. The server system includes a processing unit (also referred to herein as a "processor"), and non-transitory memory. The memory includes instructions, which when executed by the processor cause the server system to: receive the web page request from a client device. The web page request includes an identifier of the requested web page. The processor further configured to retrieve web page content based on the identifier of the requested web page. The web page content including Hypertext Markup Language (HTML) web content and one or more components that provide interactivity for the web page. The memory further includes instructions, which when executed by the processor cause the server system to: determine whether any of the one or more components are critical components, and in response to determining that at least one of the one or more components is a critical component, add the at least one critical component to an HTML head and communicating the HTML head to a client device. The memory also includes instructions, which when executed by the processor cause the server system to: communicate the remaining web page content in an HTML body to the client device for rendering.

In yet other embodiments, a client device for rendering an interactive web page is disclosed. The client device includes a client browser configured to: receive a Hypertext Markup Language (HTML) head for the web page. The HTML head includes at least one component tagged as critical and at least one component tagged as non-critical. The components provide interactivity to the web page. The client browser is further configured to initiate a component processing thread, download and store the at least one critical component in a data storage of the client browser, and download and store the at least one non-critical component in the data storage of the client browser after download of the at least one critical component is completed. The client browser is also configured to initiate a render processing thread, receive and render an HTML body for the web page, load the at least one critical component, and load the at least one non-critical component after loading the at least one critical component.

Figure 1:
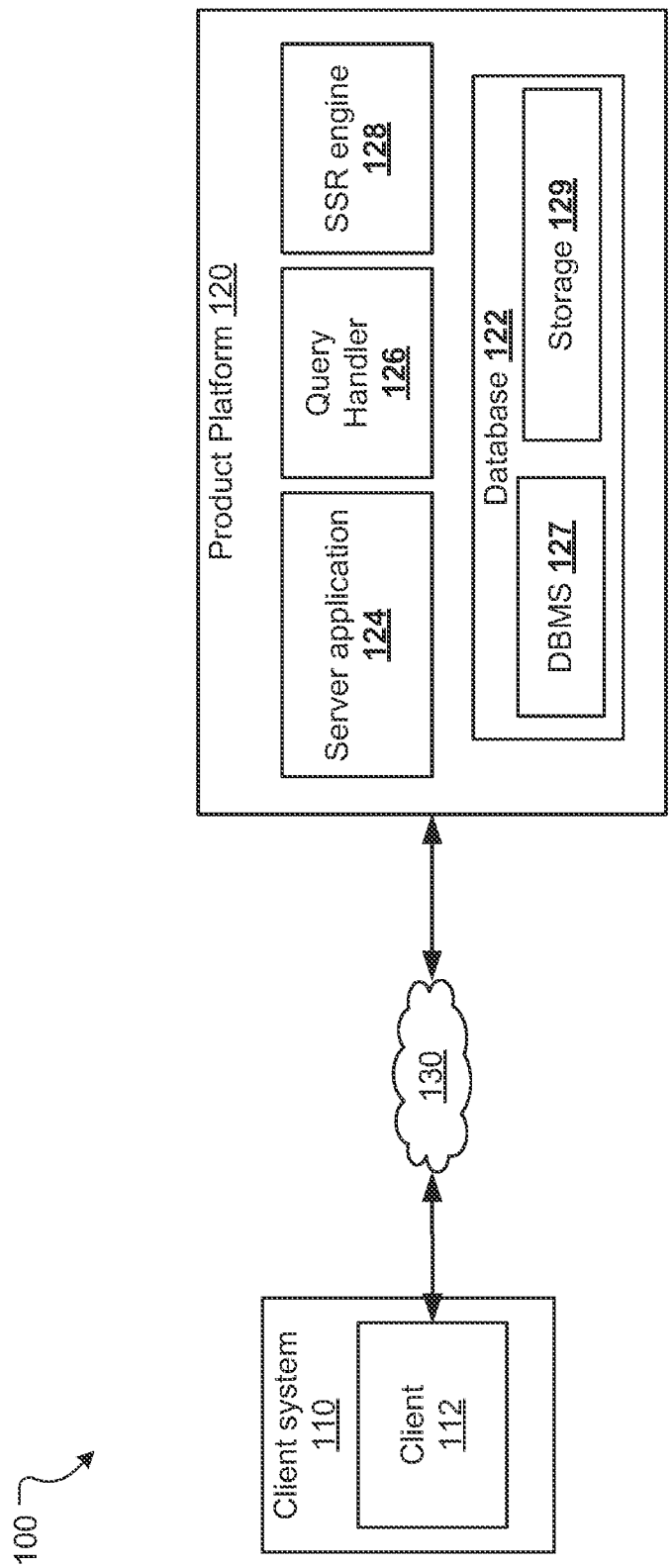
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Typically, when a user selects a web page, a web browser executing on the user's device sends a request to a server to fetch an HTML document for the web page. In response to this request, the server returns HTML text. Typically, the HTML includes the actual content and structure for the web page along with the style elements such as cascading style sheet (CSS) elements that specify the styling of the web page (including background color, layout, font, etc.). In addition, if the web page is interactive or dynamic, the HTML may include one or more scripts (such as JavaScript scripts). Examples of JavaScript include search boxes on web pages, ability to show or hide more information with the click of a button, video feeds embedded in a page, ability to automatically refresh the web page, etc.

When the browser reads the received HTML document, it parses the document and converts each HTML element encountered in the document into a node. Eventually, all HTML elements within the document are converted to nodes. After the browser has created nodes it creates a tree-like structure of these node objects, which is called a document object model (DOM) tree. A DOM tree starts from the topmost element which is an 'html' element and branches out as per the occurrence and nesting of HTML elements in the document.

After constructing the DOM, the browser reads style information from all sources (e.g., external, embedded, inline, user-agent, etc.) and constructs a tree like styling structure called a CSS object model (CSSOM). Each node in this tree contains CSS style information that will be applied to DOM elements that it targets. The browser also creates a render tree, which is a tree-like structure constructed by combining DOM and CSSOM trees together. The render tree is used to calculate the layout of each visible element and paint them on the screen.

The browser first creates the layout of each individual render tree node. The layout consists of the size of each node in pixels and where (position) it will be printed on the screen. This process is called layout since the browser is calculating the layout information of each node.

Since elements in the render tree can overlap each other and they can have CSS properties that make them frequently change the look, position, or geometry (such as animations), the browser creates layers. Creating layers helps the browser efficiently perform painting operations throughout the lifecycle of a web page such as while scrolling or resizing the browser window. Having layers also help the browser correctly draw elements in the stacking order (along the z-axis) as they were intended by the developer. Inside each layer, the browser fills the individual pixels for whatever visible property the element has such as border, background color, shadow, text, etc. This process is called rasterization. To increase performance, the browser may use different threads to perform rasterization.

The sequence of operations from creating the DOM to painting pixels on the screen is called a critical rendering path and to improve user experience, developers constantly try to reduce the time taken in the critical rendering path. This may include reducing the time to first contentful paint (FCP) (i.e., time taken by the browser to first render any text, image, non-white canvas on the screen) and reducing the time to interaction (TTI) (i.e., time taken for the webpage to be usable and respond to user input).

To reduce the time to FCP, developers try to minimize the time taken to generate the render tree. When the browser requests for a webpage and the server responds with some HTML text, a client browser starts parsing the HTML text as soon as a few characters or lines of the document are available. This way, the browser can build the DOM tree incrementally, one node at a time. However, whenever the browser encounters an external resource such as a script file (JavaScript), a stylesheet file (CSS), an image file or any other external resource in the HTML text, the browser starts downloading that file in the background (away from the main thread, where DOM parsing happens). When the browser encounters a script element (e.g., a file/code), if it an embedded script, the browser executes that script first and then continue parsing the HTML to construct the DOM tree. So embedded scripts can be considered to be parser-blocking scripts that can increase time to generate the render tree.

If the script element is an external script file, the browser starts downloading the external script file off the main thread but it will halt the execution of DOM parsing on the main thread until that file is downloaded. Once the script file is downloaded, the browser first executes the downloaded script file on the main thread and then continues with the DOM parsing. If the browser finds another such script element in HTML, it performs the same operation.

However, halting DOM parsing while the script file is downloading in the background is unnecessary in most cases and increases the rendering time.

To prevent the DOM parsing from halting and to reduce FCP time, developers can add 'async' or 'defer' tags to the script element. When the 'async' tag is used, DOM parsing is not halted while the script file is downloading. However, once the file is downloaded, DOM parsing is halted and the script is executed before parsing can resume. Alternatively, when the 'defer' tag is used, not only does DOM parsing continue while the script is being downloaded, but the script is not executed as soon as it is downloaded. Instead, the script is executed once the parser has parsed the entire HTML document, which means the DOM tree is fully constructed. Accordingly, scripts that have the defer flag do not block DOM parsing and can reduce the time to FCP.

Further, in some cases, to reduce FCP, one technique is to use server side rendering (SSR). In server side rendering, if any computational operations need to be performed (e.g., to render a chart, spreadsheet, or retrieve dynamic data), these operations can be performed on the server (which often has more powerful computation means than the client device) and the server can then deliver the content to the client as pre-computed HTML. This way, the client has to simply render the static HTML and not run as many complex, memory-intensive JavaScript functions as those functions are no longer required to complete the FCP.

However, even with these techniques, some JavaScript bundles/components need to be sent to the client and if these JavaScript bundles are very large, they may take a significant time to download and execute, which increases the TTI.

Embodiments of the present disclosure reduce the TTI by using a number of techniques. In some embodiments, aspects of the present disclosure distinguish between critical components (i.e., components required for FCP and/or TTI) and non-critical components (i.e., components that are not required for FCP and/or TTI).

For example, in the case of an issue tracking system application, such as Jira®, the fields that users interact with the most or the tasks that users are most likely to perform on a page may be considered critical. The components required to provide interactivity for such fields or tasks may be considered critical components. Whereas fields that are not typically interacted with or the tasks that users are less likely to perform on a page may be considered non-critical and the corresponding components that enable such functionalities may be defined as non-critical components. Similarly, in the case of a board page—e.g., a Trello® page that shows a board including a plurality of cards, components that are responsible for rendering the cards of the board may be defined as critical components. Whereas components responsible for providing other functionalities (such as board filter, new issue modals, configuration modals, navigation sidebar, etc.) may be defined as non-critical components.

As used in this disclosure, the term components refers to JavaScript assets that provide interactive functionality to the web page. In particular, a component may refer to JavaScript code may be divided and sent to the client as one or more JavaScript assets and provides functionality of the web page.

In aspects of the present disclosure, the client browser can be informed which components are critical (e.g., required for FCP and/or TTI) as soon as possible so that the client can begin downloading and executing these components as soon as possible. In case the web page is initially rendered on the server using SSR, components for FCP are not required to be downloaded/executed. In such cases, the client browser can be informed which components are required for TTI. Alternatively, if client side rendering is used, the client browser can be information about the components that are required for FCP and TTI.

In some embodiments, the list of components may be communicated to the client before the HTML text is communicated. In some specific examples, the list of components may be communicated to the client as part of the HTML head. Non-critical components can be tagged as such and the client can download and execute these components at a later stage (e.g., after the critical components are loaded) or when the user requests interaction with a displayed interactive element that requires that particular component to be loaded.

By communicating the list of critical components to the client in the HTML head, aspects of the present disclosure give the client a head-start, where the client can initiate download of the critical components even before it receives the HTML body to parse. This way, by the time the client has parsed the HTML body and generated the render tree, it can have all the critical interactive components downloaded and ready to execute, thereby also reducing TTI.

In some embodiments, aspects of the present disclosure utilize server side rendering (SSR) and can include mechanisms to select whether SSR is required for a component. For instance, if it is known that a component may take too long to be computed and converted into HTML at the server and the component is not required for FCP and/or TTI, the presently disclosed systems and methods may tag the component as such. At runtime, when the server receives a request for the webpage, the server can inspect the tags of the components and execute the components that are tagged for SSR. Components that are not tagged for SSR can be forwarded to the client along with their importance tags.

These and other aspects of the present disclosure will be described in detail with reference to FIGS. 1-4 below.

FIG. 1 illustrates an environment 100 in which one or more aspects of the present disclosure are implemented. Specifically, FIG. 1 illustrates the various systems involved in rendering web pages on client devices according to embodiments of the present disclosure. The systems include client system 110 and a product platform 120. The client system 110 and product platform 120 communicate with each other over one or more communication networks 130.

The product platform 120 may be a system or set of systems configured to provide any type of service/perform any type of operations for clients. In order to provide such services/operations, product platform 120 stores data in a database 122. As one example, product platform 120 may be an issue tracking system used (inter alia) to create, manage, and track issues. Product platform 120 may, however, provide other services/perform other operations.

In the present example, product platform 120 includes a server application 124, a query handler 126, and a rendering engine 128.

Server application 124 is executed by a computer processing system to configure that system to provide server-side functionality to one or more corresponding client applications (e.g., client application 112 as discussed below). Server application 124 comprises one or more application programs, libraries, APIs or other software elements that implement the features and functions that are described herein. For example, where the client application 112 is a web browser, the server application 124 is a web server such as Apache, IIS, nginx, GWS, or an alternative web server. Where the client application 112 is a specific/native application, server application 124 is an application server configured specifically to interact with that client application 112.

In some embodiments, the server application 124 may be provided with both web server and application server applications.

Database 122 includes one or more database management systems (DBMS) 127 and one or more data storage systems 129 (operating on one or multiple computer processing systems). Generally speaking, DBMS 127 receives structured query language (SQL) queries from a given application (e.g., server application 124 or rendering engine 128), interacts with data storage system 129 to read/write data as required by those queries, and responds to the relevant application with results of the query.

Database 122 may store any data relevant to the services provided/operations performed by the server application 124. In the present examples, such data includes data objects (or, in some cases, objects for short). In this context, a data object is a logical grouping of data. Data for a data object may be stored across multiple database records (e.g. across multiple database tables) that are related to one another by one or more database keys (for example object identifiers and/or other identifiers).

By way of specific example, where product platform 120 is an issue tracking system, data objects may be related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

The query handler 126 is configured to receive a web page request from a client system 110 and respond to that web page request with data defining the structure (e.g., styling information), content (e.g., the actual data to be displayed on the web page), and behavior (e.g., interactive components) of the web page. To do this, the query handler 126 is configured to identify the requested web page, requesting client device 110 and in some examples a user identifier of the user making the request, retrieve web page data for the requested web page, determine which components need to be rendered on the server and which components need to be rendered on the client, communicate the structure, content, and components that need to be rendered on the server to the rendering engine 128, receive rendered HTML data from the rendering engine 128 and communicate this along with the list of components for client side rendering to the client device 110.

The rendering engine 128 is configured to receive web page data from the query handler 126, convert the data into static HTML and communicate the HTML back to the query handler 126 for communicating to the client device 110. In some examples, the rendering engine 128 may convert all the data into static HTML before communicating an HTML file to the query handler 126. This may be useful where the webpage data is not large. However, in most cases, the web page may include large quantities of data and the web page data communicated to the rendering engine 128 may include multiple components that require computation, calls to the database 122 to retrieve latest data, etc. In such cases, waiting for all the computations to be completed and the data to be converted to HTML may take a considerable amount of time and the client device has to wait for many seconds before it can load the web page. Accordingly, to reduce the delay, the rendering engine 128 may be configured to stream HTML data to the query handler 126 as and when it is converted. This way, the query handler 126 can stream the HTML data to the client device 110, which can immediately start creating its DOM, CSSOM, and render trees and render some content on a display of the client device 110 quickly.

In certain embodiments, product platform 120 is a multi-tenanted system: i.e., server application 124 serves multiple tenants. In these embodiments, any request received by the product platform 120 is associated with a particular tenant—e.g. via a tenant identifier. For example, a given request may be received from/initiated by a particular account, and the identifier for that account will be associated with a tenant identifier.

The applications executed by product platform 120 typically run on multiple computer processing systems. For example, in some implementations each component of the product platform 120 may be executed on a separate computer processing system. In other embodiments, multiple (or even all) components of the product platform 120 may run on a single computer processing system. In certain cases a clustered server architecture may be used where applications are executed across multiple computing instances (or nodes) that are commissioned/decommissioned on one or more computer processing systems to meet system demand.

Client system 110 hosts a client application 112 which, when executed by the client system 110, configures the client system 110 to provide client-side functionality. This may include, for example, interacting with (i.e., sending data to and receiving data from) server application 124. Such interactions typically involve logging on (or otherwise accessing) server application 124 by providing credentials for a valid account maintained by the product platform 120. As noted above, in certain embodiments the account may be associated with a particular tenant identifier. Once validated, a user can perform various functions using client application 112, for example requesting web pages, generating requests to read data from or write data to database 122, automating such requests (e.g., setting requests to periodically execute at certain times), and other functions.

Client application 112 may be a general web browser application (such as Chrome, Safari, Internet Explorer, Opera, or an alternative web browser application) which accesses a server application such as server application 124 via an appropriate uniform resource locator (URL) and communicates with the server application via general world-wide-web protocols (e.g. HTTP, HTTPS, FTP). When the client application 112 is a web browser, its main function is to present web resources requested by the user. Further, a given client system 110 may have more than one client application 112, for example it may have two or more types of web browsers.

A web browser has seven main components (not shown)—a user interface, a browser engine, a rendering engine, networking module, user interface backend, JavaScript interpreter, and data storage. The user interface includes parts of the browser display, such as the address bar (where a user can enter a URL of the webpage the user wishes to view), back/forward buttons, etc. The browser engine organizes actions between the UI and the rendering engine and the rendering engine is responsible for displaying the requested content. When a web page is requested, the rendering engine analyses the received HTML and CSS files and renders the analyzed content on the screen (using the processes described earlier). The user interface backend is used to draw or paint basis widgets like combo boxes and windows and the JavaScript Interpreter is used to parse and execute JavaScript code. The data storage is a persistence layer where the browser saves data locally, such as cookies.

Client system 110 may be any computer processing system which is configured (or configurable) by hardware and/or software to offer client-side functionality. By way of example, suitable client systems may include: server computer systems, desktop computers, laptop computers, netbook computers, tablet computing devices, mobile/smart phones, and/or other computer processing systems.

The client system 110 and product platform 120 (or applications of the product platform 120) communicate data between each other either directly or indirectly through one or more communications networks 130. Communications network 130 may comprise a local area network (LAN), a public network, or a combination of networks.

The embodiments and features of the present disclosure are implemented using one or more computer processing systems. For example, client system 110 is a computer processing system and product platform 120 includes various applications and components that are provided by one or more computer processing systems.

Figure 2:
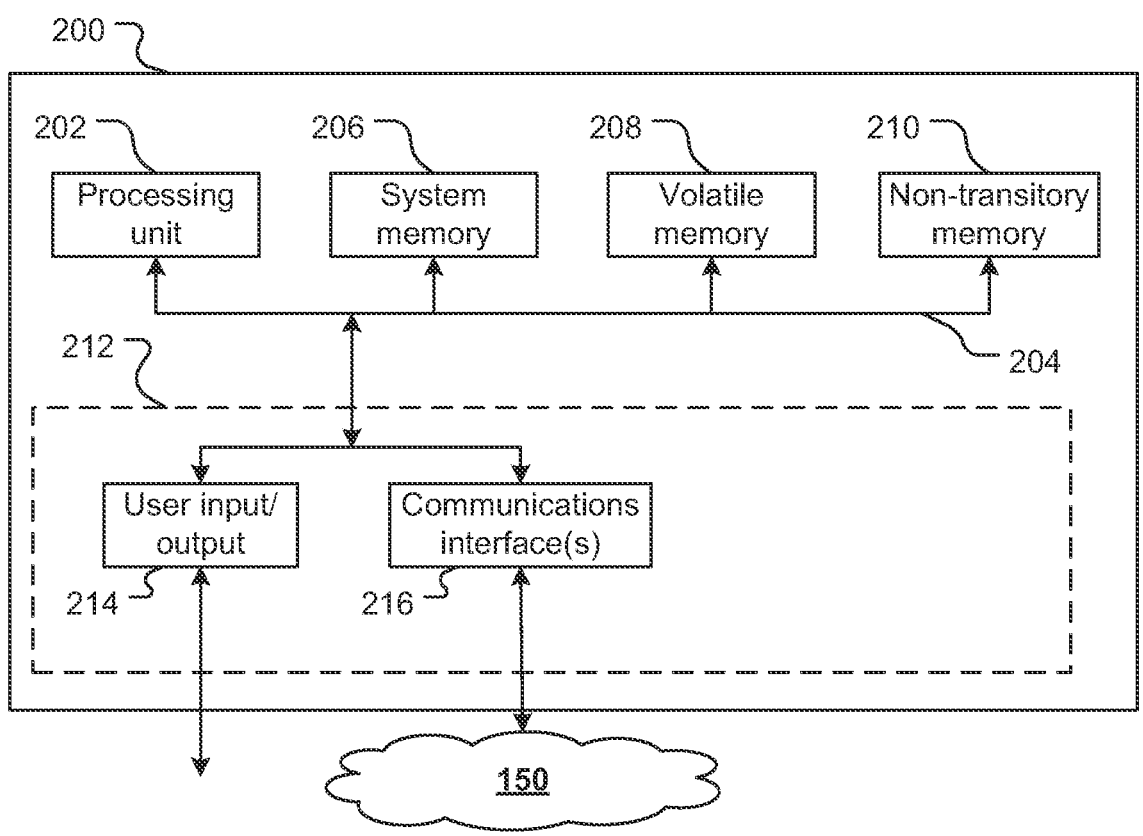
FIG. 2 is a block diagram of a computing system with which various embodiments of the present disclosure may be implemented.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202—for example a general or central processing unit, a graphics processing unit, or an alternative computational device). The processing unit 202 may also be generally referred to as a "processor" and may include a single integrated processing circuit or multiple discrete processing circuits or processors that are operably coupled in order to perform the recited processing or computing functions or services. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204, processing unit 202 is in data communication with a one or more computer readable storage devices which store instructions and/or data for controlling operation of the processing system 200. In this example system 200 includes a system memory 206 (e.g. a BIOS), volatile memory 208 (e.g. random access memory such as one or more DRAM applications), and non-volatile (or non-transitory) memory 210 (e.g. one or more hard disks, solid state drives, or other non-transitory computer readable media). Such memory devices may also be referred to as computer readable storage media (or a computer readable medium).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 200 connects—whether by wired or wireless means—include one or more input/output devices (indicated generally by input/output device interface 214). Input devices are used to input data into system 200 for processing by the processing unit 202. Output devices allow data to be output by system 200. Example input/output devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads (and/or other touch/contact sensing devices, including touch screen displays), microphones, accelerometers, proximity sensors, GPS devices, touch sensors, and/or other input devices. System 200 may also include or connect to one or more output devices controlled by system 200 to output information. Such output devices may include devices such as displays (e.g. cathode ray tube displays, liquid crystal displays, light emitting diode displays, plasma displays, touch screen displays), speakers, vibration applications, light emitting diodes/other lights, and other output devices. System 200 may also include or connect to devices which may act as both input and output devices, for example memory devices/computer readable media (e.g. hard drives, solid state drives, disk drives, compact flash cards, SD cards, and other memory/computer readable media devices) which system 200 can read data from and/or write data to, and touch screen displays which can both display (output) data and receive touch signals (input).

System 200 also includes one or more communications interfaces 216 for communication with a network, such as network 130 of environment 100. Via a communications interface 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory computer readable media accessible to system 200. For example, instructions and data may be stored on non-transitory memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows™, Apple macOS™, Apple iOS™, Android™ Unix™, or Linux™.

System 200 also stores or has access to applications which, when executed by the processing unit 202, configure system 200 to perform various computer-implemented processing operations described herein. For example, and referring to networked environment 100 of FIG. 1 above, client system 110 includes a client application 112 which configures the client system 110 to perform client system operations, and product platform 120 includes server application 124 which configures the server environment computer processing system(s) to perform the described server environment operations.

In some cases part or all of a given computer-implemented method will be performed by a single computer processing system 200, while in other cases processing may be performed by multiple computer processing systems in data communication with each other.

When developers design web pages, in addition to previously available tag types, they can add two new types of tags on any scripts/code in their web page content—a tag indicating where the corresponding script/code should be rendered (server or client) and/or a tag indicating the priority of the script/code (critical, phased, or event based).

As described previously, some components may be utilized to generate data/content for the web page. For example, consider the example of an issue view page. The web page may include one or more components that retrieve the latest issue data from the database 122 (such as issue status, issue title, current assignee, etc.) and display this on the web page. Another component may be configured to retrieve comments and/or work flow (which is typically displayed at the bottom of the page). As it might be desirable to show the main issue data as soon as the web page is displayed and as this includes one or more calls to the database 122, the developer may decide that the corresponding component is critical to FCP and should be rendered by the server instead of the client. Accordingly, the developer may add a 'server' tag and a 'critical' tag to that component. On the other hand, although the comment component may also need to make one or more calls to the database 122 to retrieve the latest comment data, but because the comments are displayed towards the bottom of the page, the developer may decide that the corresponding component is a lazy loading component that can be loaded once the initial render tree for FCP is generated. Accordingly, the developer may add a 'client' tag and a 'lazy' tag to that script. There may be other components within the web page content, e.g., to load a text editor to add a comment. As users typically do not immediately add a comment to a page they are viewing and also rarely leave comments, the developer may decide that the corresponding script is not critical to FCP and should be rendered by the client only if the user requests to leave a comment. Accordingly, the developer may add a 'client' tag and a 'conditional' tag to the component.

In this manner, the developer may assign tags to components in the web page content. If one or more components are not tagged, the query handler may assign default tags—e.g., 'server' and 'lazy' tags.

Once the components are tagged and the design process is completed, the content for a web page (including HTML text, CSS files, and interactive/dynamic components) is stored in the database 122 or in a cache of the query handler 126.

Figure 3:
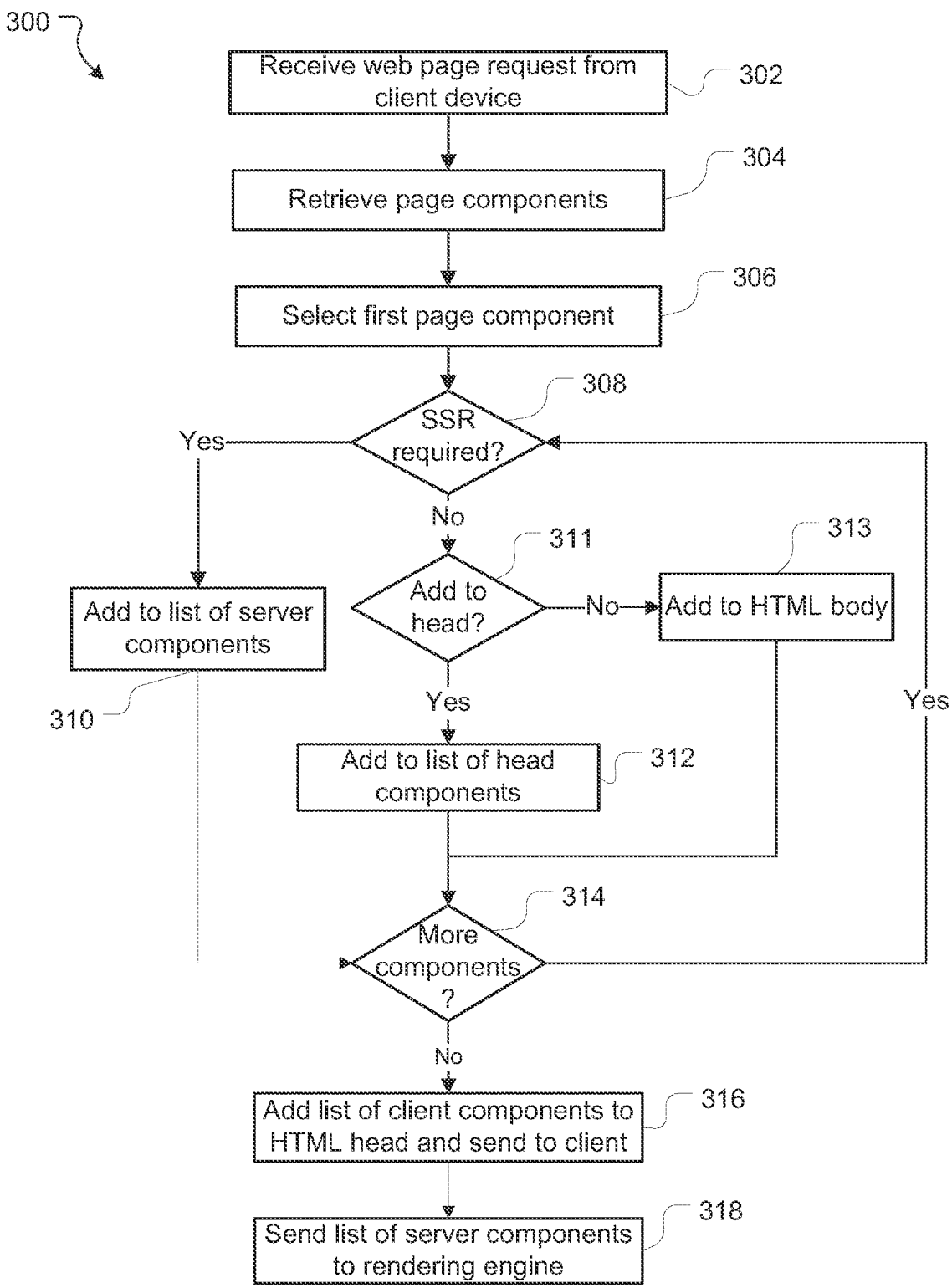
FIG. 3 is a flowchart illustrating a method for responding to a web page request according to some embodiments of the present disclosure.

FIG. 3 illustrates an example method 300 for receiving a web page request and responding to the request according to some embodiments of the present disclosure.

The method 300 commences at 302, where the query handler 126 receives a web page request from a client device 110. In some cases, a user may enter a web page URL in a search bar of the web browser or select a particular web page from list of search results. In other cases, the browser may automatically generate and send the web page request, for example, when a user logs into an application hosted by the product platform 120 via a login page. In any event, the web page request includes a URL or any other identifier of the web page. For instance, the web page request may be as follows—HTTP GET www.jira.com/issueview.

In addition, the web page request may include some information about the client application 112 making the request (e.g., a client application identifier). If the user is logged into the application, the web page request may also include a user identifier of the user and in some cases the tenant identifier of the corresponding tenant (for example, if the product application is a multi-tenanted application).

At step 304, the query handler 126 receives the web page request and retrieves the requested web content. In some examples, the query handler 126 may store web page content (e.g., HTML, CSS and interactive/dynamic components) in a cache for quick retrieval. In other cases, web page content may be stored in the database 122 and the query handler 126 may retrieve the web page content from the database 122.

The query handler 126 then parses the retrieved content to identify the components included in the web content and at step 306 selects a component to be processed. In the present embodiment, the query handler 126 processes components in the order in which they appear in the web page content. Initially, therefore, the query handler 126 selects the first component it identifies in the web content.

At 308, the query handler 126 inspects the tag of the selected component (if any). As described previously, a developer may add a 'server' or 'client' tag on a component. Alternatively, no tag may be added. If no tag is added, in some examples, the query handler 126 may be configured to determine the selected component to be a server component—i.e., a component to be executed at the server. In other examples, if no tag is added, the query handler 126 may be configured to determine the selected component to be a client component—i.e., component to be executed by the client.

At step 308, if the query handler 126 determines that the component is to be executed by the server (e.g., because of the presence of a server tag or a default setting in case no tag is detected), the method 300 proceeds to step 310 where the component is added to a list of components for server rendering.

Alternatively, if the query handler 126 determines that the component is to be executed by the client (e.g., because of the presence of a client tag or a default setting in case no tag is detected), the method 300 proceeds to step 311 where the query handler 126 determines whether the component needs to be communicated in the HTML head or not.

In some embodiments, the query handler 126 may be configured to add critical client components and lazy client components in the HTML head, whereas it may be configured to ignore other types of client components (such as conditional loading components), which can be communicated as part of the HTML body.

Accordingly, at step 311 a determination is made whether the selected component is to be added to the head of the HTML or not. If it is determined that the component should be added to the HTML head (e.g., because the component has a 'critical' tag or a 'lazy' tag), the method proceeds to step 312 where the query handler 126 adds the component to a list of head components along with its importance tag. If an importance tag is not present, the query handler may assign a default importance tag, such as 'lazy'.

Alternatively, if at step 311 a determination is made that the component does not need to be added to the HTML head (e.g., because the component has a 'conditional' tag), the method proceeds to step 313 where the corresponding component is added to the HTML body.

At step 314, the query handler 126 determines whether there are any unprocessed components in the web content. If so, processing returns to step 306 to select the next unprocessed component. If all components have been processed, processing continues to step 316, where the query handler adds the list of head components (along with their importance tags) to a head of the HTML and communicates the head to the client browser. In addition, the HTML head can include configuration information such as user details, server endpoint addresses, and instance related values like licenses and products available.

At step 318, all the components added to the server component list and to the HTML body are communicated to the server rendering engine 128. The server rendering engine 128 then executes the server components, converts them into HTML and communicates it as HTML body to the client browser (along with static HTML, CSS for the web page, and any components added at step 313). As the HTML body is streamed to the client browser, the server rendering engine 128 can communicate the HTML and CSS first and then start communicating the converted HTML as soon as the corresponding server components are executed and doesn't have to wait until all the server components are executed. This way, the client browser can start generating the DOM, CSSOM and render trees as soon as the client starts receiving the HTML body.

It will be appreciated that the server rendering engine 128 renders the server components using known techniques and therefore this operation is not described in detail here.

Figure 4:
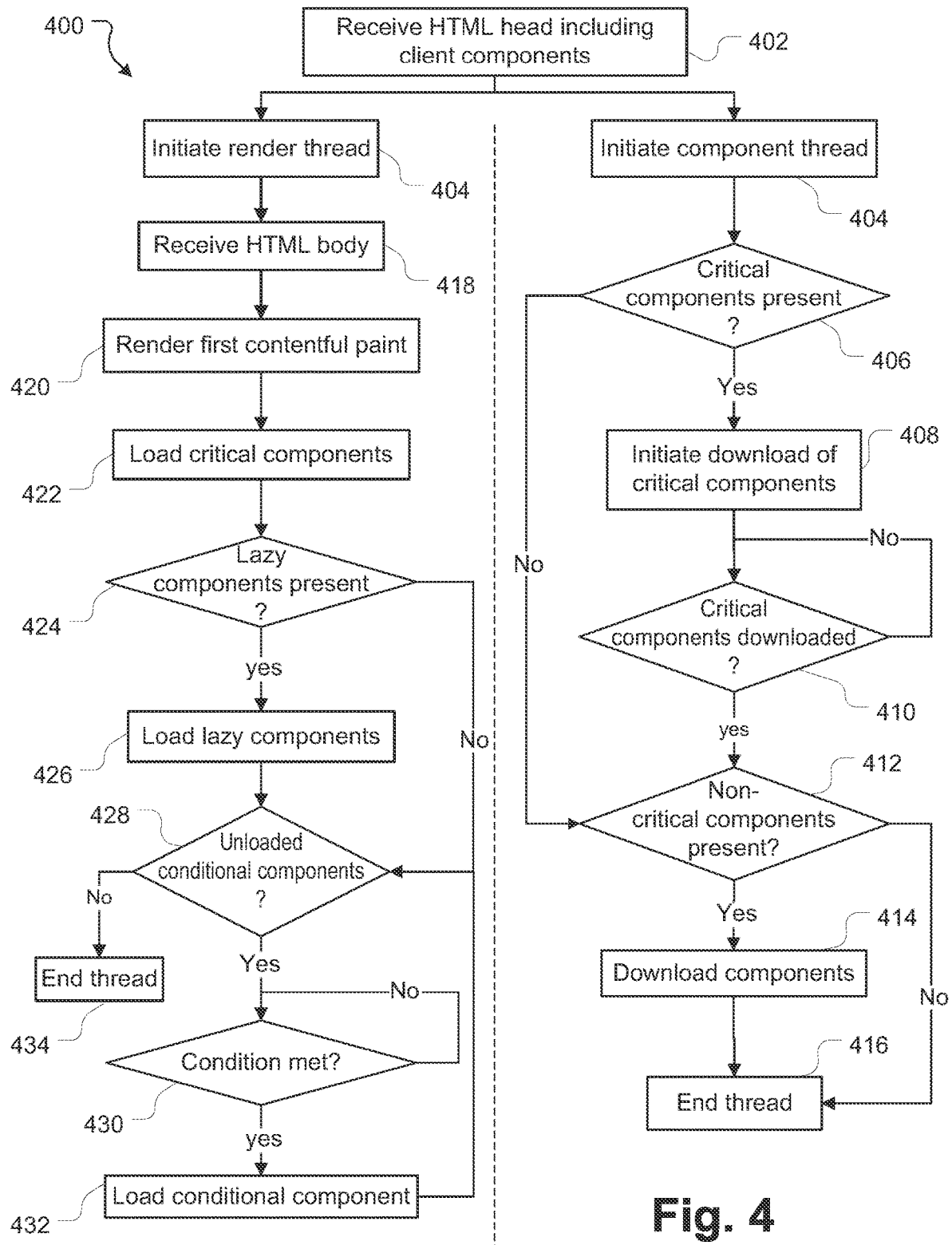
FIG. 4 is a flowchart illustrating a method for requesting and rendering a web page on a client device according to some embodiments of the present disclosure.

FIG. 4 illustrates an example method 400 for rendering a requested web page at the client device 110. The method commences at step 402, where the client browser 112 receives an HTML head for the web page requested at step 302 of method 300. The head includes one or more components that the client browser has to load and that were added to the head at step 316.

Once the client browser receives the HTML head it performs a number of functions. In particular, it may initiate multiple processing threads—e.g., it may initiate a component processing thread and a render processing thread. Using the component processing thread, the client browser 112 may download one or more components listed in the HTML head. Using the render processing thread, the client browser may render the web page for display on the display of the user device.

For clarity, the operations of the component thread will be described first followed by the operation of the render processing thread. However, it will be appreciated that the component thread and the rendering thread may perform their respective functions in parallel. If the render thread requires any components downloaded by the component thread, it retrieve the component from the client browser data storage once the component is downloaded.

Once the component thread and the render thread are initiated (at step 404), the method proceeds to step 406, where the component processing thread determines whether any critical components are provided as part of the HTML head. As described previously, the components may be tagged as 'critical' (i.e., components that provide interactive functionality required for useful user interaction with the web page), 'lazy' (i.e., components that are not as important to provide useful user interaction with the web page immediately) and 'conditional' (i.e., components that do not need to be loaded unless a condition is met).

To determine whether any critical components are present, the component thread may inspect the importance tags associated with the components provided as part of the HTML head. If any critical components are identified, the method proceeds to step 408, where the component processing thread initiates download of the critical components.

If more than one critical component is discovered, the client browser may be configured to download or retrieve the corresponding components in parallel.

At step 410, a check is made to see if the critical components have downloaded. If there are multiple critical components, the component thread checks the download status of each of the critical components and as soon as it determines that a corresponding component has downloaded completely, (yes path from step 410), the component download thread stores the downloaded component in the bowser data storage, from where the render processing thread can retrieve the component.

Once it determines all the critical components have been downloaded, the method proceeds to step 412, where the component processing thread determines if any non-critical components were provided as part of the HTML head. Again, this determination may be made by inspecting the importance tag associated with each of the components provided in the HTML head.

If the client bowser determines that one or more non-critical components are present, e.g., because it identifies any 'lazy' tags, the method proceeds to step 414 where the component thread initiates download of the lazy components.

Once the non-critical components are downloaded, the client browser may save the downloaded components in the browser data storage for execution/loading by the render thread.

When all components provided as part of the HTML head are downloaded, the component processing thread may be terminated.

Returning to step 406, if at this step the client browser determines that no critical components are present in the HTML head, the method directly proceeds to step 412 where a determination is made whether non-critical components are present. At step 412 also if the client browser determines that no non-critical components are present, the method 400 may directly proceed to step 416 where the component processing thread is terminated.

Steps 406-416 are performed by the component processing thread. Now operations of the render thread will be described.

At step 418, the render processing thread receives the HTML body. In some examples, the HTML body may be received a few hundred milliseconds after the HTML head is received. As HTML may be streamed, the client browser receives the HTML body in a stream. As soon as it receives some HTML body text, the client browser begins to generate the DOM, CSSOM, and render tree for the web page. As soon as some of the render tree is generated, the client browser may initiate painting operations.

At step 420, the render thread may render the FCP of the web page. It will be appreciated that the FCP may display all the content, structure and styling of the web page that is visible on the display screen of the user device. However, it may not include any behavior or interactive functions. That is, the user may be able to read the content of the web page and look at the structure and styling of the web page, but may not be able to select any interactive elements of the web page (such as buttons, checkboxes, tabs, etc.) at this stage.

At step 422, the render thread retrieves downloaded critical components from the browser data storage. As described previously, the component thread may download the critical components in parallel or sequentially. In any case, some components may finish downloading before other components (e.g., because of the component size). Accordingly, the component processing thread may store the downloaded critical components in the browser data storage in a staggered fashion—as soon as the corresponding component has finished downloading and therefore, step 422 may be a recurring step, where the render thread retrieves critical components from the data store until all critical components have been retrieved.

At step 422, as and when the render processing thread requires critical components it retrieves the critical components from the browser data storage and loads the component—(this may include executing the component code, converting into HTML, adding the converted HTML to the DOM, CSSOM, and render trees and adding the corresponding interactive behavior to the corresponding displayed web page element).

Once all critical component have been loaded, the web page is considered interactive. The method then proceeds to step 424 where the render processing thread determines if any 'lazy' components are included in the web content. If it identifies any lazy components (e.g., based on importance tags of the components saved in the browser data store), the method proceeds to step 426 where the lazy components are loaded. This is similar to step 422 and therefore is not described in detail again.

Once the lazy components are loaded, the method proceeds to step 428, where the render processing thread determines if any unloaded conditional components are present in the web content—e.g., received as part of the HTML body. If it identifies any unloaded conditional components in the HTML body, the method proceeds to step 430, where a determination is made whether the condition to load one or more of the identified conditional components is met. In some cases, a condition to load a conditional component may be the loading of another related component. In other cases, the condition may be a particular event, such as a user input to a particular displayed element.

If at step 430, a determination is made that the condition is met, the corresponding conditional component is downloaded and loaded at step 432.

Alternatively, if the condition for any conditional components has not been met, the method 400 remains on step 430 until the condition for any one of the unloaded conditional components is met. Once the condition is met, the method proceeds to step 432 and then returns to step 428 to check if any unloaded conditional components remain.

Returning to step 428, if a determination is made at this step that the web page does not include any unloaded conditional components, the method proceeds to step 434 where the render process is considered completed and the render processing thread is terminated.

In this manner, the web browser of the presently disclosed embodiments, can download the critical components as soon as the HTML head is received and even before the HTML body is received. The critical components can then be ready for loading as soon as the FCP is rendered and critical interactivity can be provided to the web page sooner than that provided by previously known techniques.

By communicating the critical components to the browser client for download earlier, almost the entirety of server time duration (i.e., the time taken by the server to render the web page) can be offset and TTI can be improved by a large margin. Also by splitting components into critical and non-critical components, TTI can be further reduced by loading only the components the users really needs. On a page where server SSR takes 1.5 seconds and Tti is 8 s when loading all components, TTI can be reduced 60 6 seconds using the presently disclosed techniques. Also, further improvements are possible by better tagging critical and non-critical components during web page design.

In the embodiments described above, it is assumed that some server side scripting/rendering is performed at the server. In other embodiments, all of the script execution and rendering can take place at the client. In such embodiments, a server rendering engine 128 is not required. Further, there is no need for server/client tags in such embodiments as there is not execution at the server. Instead, a list of identified critical and lazy components are communicated to the client in the HTML head so that the client can start downloading and executing the critical components as soon as possible. The non-critical lazy components can be downloaded and executed once the critical components have completed downloading.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method for responding to a web page request, the method comprising:
   at a server:
   receiving the web page request from a client device, the web page request including an identifier of a requested web page;
   retrieving web page content based on the identifier of the requested web page, the web page content including Hypertext Markup Language (HTML) web content and one or more components that provide interactivity for the requested web page;
   determining whether any of the one or more components are critical components;
   in response to determining that at least one of the one or more components is a critical component, adding the at least one critical component to an HTML head and communicating the HTML head to the client device; and
   communicating a remaining web page content in an HTML body to the client device for rendering.

2. The computer-implemented method of claim 1, further comprising:
   determining whether any of the one or more components require server side rendering; and
   in response to determining that at least one of the one or more components requires server side rendering, rendering the one or more components at the server before communicating in the HTML body to the client device.

3. The computer-implemented method of claim 2, wherein determining whether any of the one or more components require server side rendering includes inspecting a tag associated with a respective component of the one or more components.

4. The computer-implemented method of claim 1, wherein determining whether any of the one or more components are critical components includes inspecting a tag associated with a respective component of the one or more components.

5. The computer-implemented method of claim 1, further comprising:

determining whether any of the one or more components is a lazy loading component; and in response to determining that at least one of the one or more components is a lazy loading component, adding a respective components of the one or more components to the HTML head.

6. The computer-implemented method of claim 5, wherein determining whether any of the one or more components is a lazy loading component includes inspecting a tag associated with a respective component of the one or more components.

7. The computer-implemented method of claim 1, further comprising:

determining whether any of the one or more components is a conditional component; and in response to determining that at least one component is a conditional component, adding the at least one component to the HTML body.

8. The computer-implemented method of claim 7, wherein determining whether any of the one or more components is a conditional component includes inspecting a tag associated with a respective component of the one or more components.

9. A computer-implemented method for rendering an interactive web page, the method comprising:

at a client browser:

receiving a Hypertext Markup Language (HTML) head for the interactive web page, the HTML head including at least one component tagged as critical and at least one component tagged as non-critical, the components providing interactivity to the interactive web page;

initiating a component processing thread;

downloading and storing the at least one critical component in a data storage of the client browser;

downloading and storing the at least one non-critical component in the data storage after download of the at least one critical component is completed;

initiating a render processing thread;

receiving and rendering an HTML body for the interactive web page;

loading the at least one critical component; and loading the at least one non-critical component after loading the at least one critical component.

10. The computer-implemented method of claim 9, further comprising:

determining that the interactive web page includes at least one component tagged as a conditional component;

monitoring interaction of a user with the interactive web page to determine whether a condition for loading the conditional component is met; and in response to determining that the condition for loading the conditional component is met, loading the conditional component.

11. A server system for responding to a web page request, the server system comprising:

a processing unit;

non-transitory memory, the memory comprising instructions, which when executed by the processing unit cause the server system to:

receive the web page request from a client device, the web page request including an identifier of a requested web page;

retrieve web page content based on the identifier of the requested web page, the web page content including Hypertext Markup Language (HTML) web content and one or more components that provide interactivity for the requested web page;

determine whether any of the one or more components are critical components;

in response to determining that at least one of the one or more components is a critical component, add the at least one critical component to an HTML head and communicate the HTML head to the client device; and communicate a remaining web page content in an HTML body to the client device for rendering.

12. The server system of claim 11, wherein the memory further comprising instructions, which when executed by the processing unit, cause the server system to:

determine whether any of the one or more components require server side rendering; and in response to determining that at least one of the one or more components requires server side rendering, render the at least one component at the server before communicating in the HTML body to the client device.

13. The server system of claim 12, wherein determining whether any of the one or more components require server side rendering includes inspecting a tag associated with the one or more components.

14. The server system of claim 11, wherein determining whether any of the one or more components are critical components includes inspecting a tag associated with the one or more components.

15. The server system of claim 11, wherein the memory further comprising instructions, which when executed by the processing unit, cause the server system to:

determine whether any of the one or more component is a lazy loading component; and in response to determining that at least one of the one or more components is a lazy loading component, add the at least one component to the HTML head.

16. The server system of claim 15, wherein determining whether any of the one or more components is a lazy loading component includes inspecting a tag associated with the one or more components.

17. The server system of claim 11, wherein the memory further comprising instructions, which when executed by the processing unit, cause the server system to:

determine whether any of the one or more components is a conditional component; and in response to determining that at least one component is a conditional component, add the at least one component to the HTML body.

18. The server system of claim 17, wherein determining whether any of the one or more components is a conditional component includes inspecting a tag associated with the one or more components.

19. A client device for rendering an interactive web page, the client device comprising:

a memory storing executable instructions; and a processor configured to access the memory and execute the executable instructions to instantiate a client browser, the client browser configured to:

receive a Hypertext Markup Language (HTML) head for the interactive web page, the HTML head including at least one component tagged as critical and at least one component tagged as non-critical, the components providing interactivity to the interactive web page;

initiate a component processing thread;

download and store the at least one critical component in a data storage of the client browser;

download and store the at least one non-critical component in the data storage of the client browser after download of the at least one critical component is completed;
initiate a render processing thread;
receive and render an HTML body for the interactive web page;
load the at least one critical component; and
load the at least one non-critical component after loading the at least one critical component.

20. The client device of claim 19, wherein the client browser is further configured to:
determine that the interactive web page includes at least one component tagged as a conditional component;
monitor interaction of a user of the client device with the interactive web page to determine whether a condition for loading the conditional component is met;
in response to determining that the condition for loading the conditional component is met, load the conditional component.

* * * * *